Nov. 8, 1955     E. STEINER     2,722,851

SPEED REDUCERS

Filed Oct. 6, 1952

INVENTOR.
EDWIN STEINER
BY Alfred W. Petchaft
ATTORNEY

United States Patent Office 2,722,851
Patented Nov. 8, 1955

2,722,851

SPEED REDUCERS

Edwin Steiner, Dallas, Tex., assignor to Albert F. Woodell, Dallas, Tex.

Application October 6, 1952, Serial No. 313,296

4 Claims. (Cl. 74—802)

This invention relates in general to certain new and useful improvements in speed reducers and, more particularly, to a speed reducer adapted for use in the chuck of an electric drill or other similar direct-driven high speed tool.

Electric drills, for example, consist primarily of an electric motor mounted within a suitable housing and directly connected to a chuck for removably holding the drill bit. For drilling and similar operations, it is necessary that the electric drill operate at relatively high speeds, but speeds which are conventional for drilling operations are ordinarily excessive for other types of mechanical operations in which an electric drill might otherwise serve as a very useful source of motive power. For instance, it would be extremely useful to be able to insert a screw-driving bit into the chuck of an electric drill and utilize the tool for driving screws, but the speed of the ordinary electric drill is so great that the screw-driving bit could not be held in the nick of the screw and the average electric drill would tend to operate at a speed-power ratio which would be completely inefficient.

The use of a rheostat or similar electrical means for slowing down the motor of the conventional type of electric drill would result in such a severe power loss that the ordinary tool would be completely inoperative, or contrariwise, it would be necessary to provide such a large bulky motor that the drill would become cumbersome and unwieldy. Such expedient would, furthermore, materially reduce the portability of the tool and would probably increase the cost so greatly that the tool would become much too costly.

It is, therefore, the primary object of the present invention to provide a speed reducer adapted for use with electric drills and similar direct-driven tools which will reduce the speed of the output while materially increasing the transmitted power.

It is another object of the present invention to provide a speed reducer of the type stated which is simple, rugged and durable, and can be manufactured at relatively low cost.

It is a further object of the present invention to provide a speed reducer of the type stated which can be utilized with an electric drill or similar hand tool without in any way impairing the portability of the tool or rendering it more cumbersome and awkward to use.

It is an additional object of the present invention to provide a speed reducer of the type stated which not only provides the mechanic with a source of rotary power of lower speed, but also makes it possible for the mechanic to control the speed of the output shaft within relatively wide limits.

With the above and other objects in view, my invention resides in the novel features of form, construction, arrangement, and combination of parts presently described and pointed out in the claims.

In the accompanying drawings—

Figure 1:
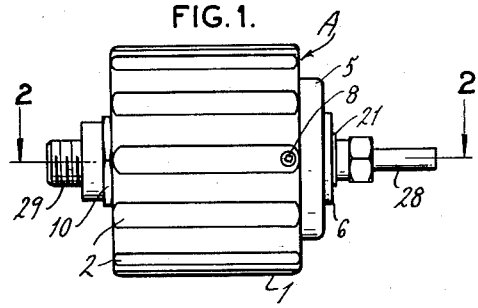
Figure 1 is a side elevational view of a speed reducer constructed in accordance with and embodying the present invention.
Figure 3:
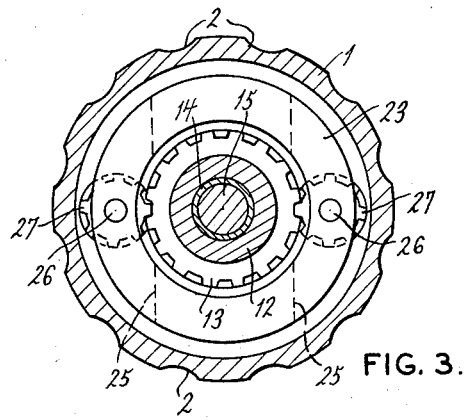
Figure 2:
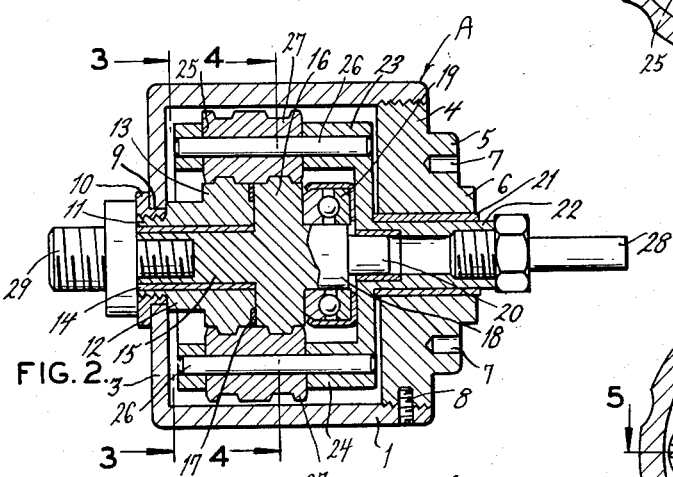
Figure 2 is a longitudinal sectional view taken along line 2—2 of Figure 1.
Figure 4:
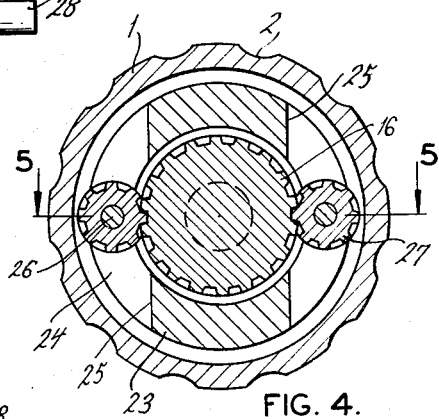
Figure 5:
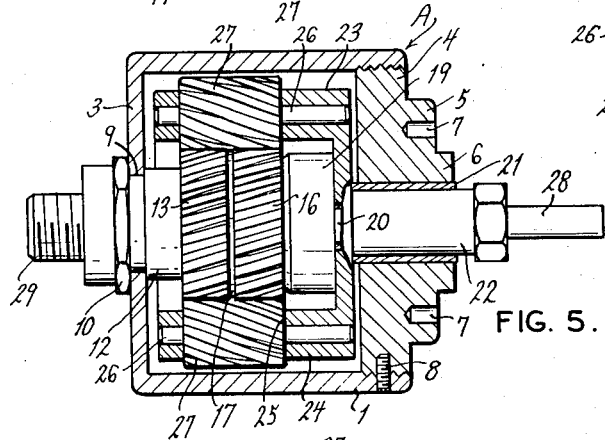

Figures 3 and 4 are transverse sectional views taken along lines 3—3 and 4—4, respectively, of Figure 2;

Figure 5 is a longitudinal sectional view taken along line 5—5 of Figure 4; and

Figure 6:
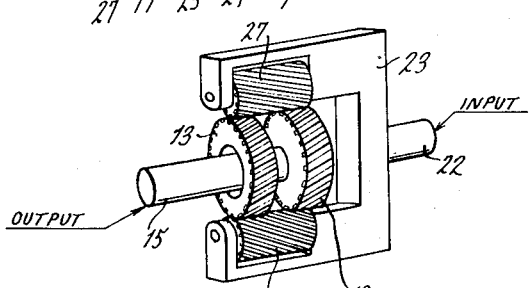

Figure 6 is a diagrammatic view of the speed reducer illustrating the functional relation of the several operating parts thereof.

Referring now in more detail and by reference characters to the drawings, which illustrate a preferred embodiment of the present invention, A designates a speed reducer comprising a hollow cylindrical shell or casing 1 provided around its outer surface with a series of flutes or indentations 2 to facilitate manual gripping thereof by the user. At one end, the casing 1 is integrally provided with a transversely extending circular end wall 3 and at its other or opposite end is internally threaded for receiving an externally threaded circular bearing plate 4 integrally including an annular shoulder 5 and a concentric boss 6 extending axially from the outer face thereof. The shoulder 5 is provided with a pair of diametrally opposite drill holes 7 for receiving a conventional spanner wrench or other tool (not shown) by which the bearing plate 4 may be turned into plate. The casing 1 and bearing plate 4 are mutually drilled and tapped for receiving a set screw 8 by which the bearing plate 4 may be locked securely within the casing 1 when it has been threaded inwardly into proper fully seated position.

The end wall 3 of the housing or casing 1 is concentrically bored in the provision of an aperture 9 for receiving and snugly accommodating a collar nut 10 which is threaded retentively upon the diametrally reduced threaded end 11 of a gear hub 12 integrally forming a part of a spiral gear 13 which thus becomes rigidly fixed to and a part of the casing 1. The gear 13 and its associated hub 12 are axially bored for receiving an oilite sleeve 14 which, in turn, rotatively supports the elongated shaft-like spindle 15 of a second spiral gear 16, which is also journaled against the face of the gear 13 by means of an oilite washer 17. On its opposite end, the gear 16 is provided with a short, shaft-like hub-extension 18, which is, in effect, a continuation of the spindle 15 and projects operatively through a conventional thrust roller bearing assembly 19. On its projecting end beyond the thrust bearing 19, the hub-extension 18 is coaxially turned down in the provision of a short stub-spindle 20.

The bearing plate 4 is coaxially drilled for receiving an oilite bearing sleeve 21 which rotatably supports a tubular spindle 22 forming an integral part of an open-ended cylindrical gear cage 23, which is, in turn, milled out tangentially along diametrally opposite portions of its cylindrical side wall or skirt 24 in the provision of slots 25 and is provided across such slots 25 with opposed parallel shafts 26 for rotatably supporting planetary gears 27 adapted for simultaneously meshing with the gears 13, 16. Threadedly mounted within and projecting axially from the outer end of the tubular spindle 22 is a shank-piece 28 adapted for conventional engagement in the chuck of a conventional electric drill (not shown) and similarly threaded in the outer end of the spindle 15 is an externally threaded driven-member 29 onto which a screw-driving bit, socket wrench, or any other conventional rotary tool may be affixed. Since the rotary tool is conventional and does not form a part of the present invention, it is not shown or described herein.

As may be seen from the diagrammatic drawing, Figure 6, the two identical gears 27 function as planetary gears and the gear 13 functions as a sun gear. The tubular spindle 22 and associated cage 23 (the latter being shown in skeletonized form in Figure 6 for purposes of clarity) serve as a power input and the spindle 15, which is an integral part of the gear 16, serves as the power output. The planetary gears 27 are identical in size, tooth-shape, and pitch and may have any selected number of teeth, the number of teeth in these gears not being critical. The gears 13 and 16 are of the same external tooth shape and are both adapted to mesh simultaneously with the planetary gears 27, as above pointed out. In the preferred embodiment here described, the gears 13, 16, and 27, are spiral gears, but it should be understood that spur gears or any similar type of gear may be employed with equal facility.

The gears 13 and 16, however, must have a different number of teeth in order to effect a ratio of speed reduction. The formula for the mechanism is as follows:

$$\frac{N^1 - N^2}{N^1} = \frac{R \text{ output}}{R \text{ input}}$$

wherein $N^1$ is the number of teeth for the gear 13, $N^2$ is the number of teeth for the gear 16, R output is the number of revolutions per minute of the driven-member 29, and R input is the number of revolutions per minute of the shank-piece 28. For instance, in the embodiment shown in the drawing, the gear 13 has eighteen teeth and the gear 16 has sixteen teeth. With these values substituted, the above formula appears as follows:

$$\frac{18 - 16}{18} = \frac{2}{18} = \frac{1}{9}$$

Thus, it appears that with this relationship between the numbers of teeth for the gears 13, 16, the speed reducer A will have a speed reduction ration of 9 to 1; that is to say, the driven-member 29 will make one revolution for every nine revolutions of the shank-piece 28 when the outer shell or housing 1 is held stationary. It will also be obvious, in this connection, that if the casing 1 is allowed to rotate freely, no motion will be transmitted to the driven-member 29. Similarly, if the shell or housing 1 is allowed to slip somewhat, the speed ratio can be varied substantially at will from zero up to the ratio of 9 to 1. It should also be pointed out in this connection that the speed reducer A can be constructed in extremely compact size without sacrificing ruggedness or durability and for ordinary purposes, such as use with conventional electric hand drills, the outside diameter of the shell 1 need not be any greater than 2½ to 3 inches so that it may be very conveniently held within the palm of the user's hand. Consequently, the user may grip the outside of the shell 1 firmly and very easily hold it stationary or may, if the circumstances of the work require, release his grip slightly and allow the shell to slip somewhat within his hand to achieve even greater speed reduction that the established ratio for which the speed reducer A is designed.

In use, the shank-piece 28 of the speed reducer A is inserted within the chuck of an electric drill or other similar power driven tool and the screw driving bit, socket wrench or other operating tool is fastened upon the driven-member 29. Thereupon, when power is turned on and the shell or housing 1 is manually gripped by user, the rotary power transmitted to the shank-piece 28 will rotate the cage 23, causing the planetary gears 27 to rotate around the sun gear 13 and be reversely rotated themselves about their own shafts 26. This rotary motion is transmitted by the planetary gears 27 to the driven gear 16 at the above mentioned speed ratio, thereby rotating the driven-menber 29. Since the interior of the shell or housing 1 can be effectively packed with a suitable lubricant and is an entirely sealed unit, the device can be used for many years without any attention or repair.

It should be understood that changes and modifications in the form, construction, arrangement, and combination of the several parts of the speed reducer may be made and substituted for those herein shown and described without departing from the nature and principle of my invention.

Having thus described my invention, what I claim and desire to secure by Letters Patent is:

1. In combination with a screw driving bit or similar thrust-transmitting tool, a speed reducer for connecting such tool to a portable electric power driven hand tool, said reducer comprising a generally cup-shaped cylindrical housing adapted to be manually gripped and held stationary in the hand of the user, said housing having a removable end-wall and another end-wall parallel thereto, a sun gear mounted concentrically in the housing and axially spaced from said removable end-wall, means removably securing the sun gear rigidly to said other end-wall, a cage sized for rotating movement within the housing and being disposed in outwardly spaced co-axial relation to the sun gear, said cage having a shaft journaled in said removable end-wall and extending outwardly therethrough, said shaft being in co-axial alignment with the sun gear, said cage also including arms formed integrally with the shaft and extending radially outwardly therefrom in symmetrical relationship, each arm being provided at its outer end with an arm-extension which is parallel to the axis of the shaft, a driven gear disposed within the housing with its axis in concentric alignment with the sun gear and the shaft of the cage, said driven gear having one end face axially spaced from the inwardly presented surfaces of the arms, a thrust bearing operatively interposed between said end face and said surfaces, a driven shaft operatively associated with said driven gear and having said thrust-transmitting tool operatively connected thereto, said sun gear and driven gear being respectively provided with different numbers of teeth, and planetary gears rotatably mounted on said arm-extensions of the cage and simultaneously meshing with the sun gear and driven gear.

2. In combination with a screw driving bit or similar thrust-transmitting tool, a speed reducer for connecting such tool to a portable electric power driven hand tool, said reducer comprising a generally cup-shaped cylindrical housing adapted to be manually stationary in the hand of the user, said housing having a removable end-wall and another end-wall parallel thereto, a sun gear having an axially outwardly projecting quill-shaft, mounted concentrically in the housing and axially spaced from said removable end-wall, means removably securing the sun gear to said other end-wall with said quill-shaft extending through said other end-wall, a cage sized for rotating movement within the housing and being disposed in outwardly spaced co-axial relation to the sun gear, said cage having a shaft journaled in said removable end-wall and extending outwardly therethrough, said shaft being in co-axial alignment with the sun gear, said cage also including arms formed integrally with the shaft and extending radially outwardly therefrom in symmetrical relationship, each arm being provided at its outer end with an arm-extension which is parallel to the axis of the shaft, a driven gear disposed within the housing with its axis in concentric alignment with the sun gear and the shaft of the cage, said driven gear having one end face axially spaced from the inwardly presented surfaces of the arms, a ball-type anti-friction thrust bearing operatively interposed between said end face and said surfaces, a driven shaft operatively associated with said driven gear and having said thrust-transmitting tool operatively connected thereto, said sun gear and driven gear being respectively provided with different numbers of teeth, and planetary gears rotatably mounted in the cage and simultaneously meshing with the sun gear and driven gear.

3. In combination with a screw driving bit or similar thrust-transmitting tool, a speed reducer for connecting such tool to a portable electric power driven hand tool, said reducer comprising a generally cup-shaped cylindrical housing adapted to be manually gripped and held stationary in the hand of the user, said housing having a removable end-wall and another end-wall parallel thereto, a sun gear having an axially outwardly projecting quill-shaft, mounted concentrically in the housing and axially spaced from said removable end-wall, means removably securing the sun gear to said other end-wall with said quill-shaft extending through said other end-wall, a cage sized for rotating movement within the housing and being disposed in outwardly spaced co-axial relation to the sun gear, said cage having a shaft journaled in said removable end-wall and extending outwardly therethrough, said shaft being in co-axial alignment with the sun gear, said cage also including arms formed integrally with the shaft and extending radially outwardly therefrom in symmetrical relationship, each arm being provided at its outer end with an arm-extension which is parallel to the axis of the shaft, a driven gear disposed within the housing with its axis in concentric alignment with the sun gear and the shaft of the cage, said driven gear having one end face axially spaced from the inwardly presented surfaces of the arms, a ball-type anti-friction thrust bearing operatively interposed between said end face and said surfaces, a driven shaft operatively associated with said driven gear and having said thrust-transmitting tool operatively connected thereto, and extending journalwise through the quill-shaft, said sun gear and driven gear being respectively provided with different numbers of teeth, and planetary gears rotatably mounted in the cage and simultaneously meshing with the sun gear and driven gear.

4. In combination with a screw driving bit or similar thrust-transmitting tool, a speed reducer for connecting such tool to a portable electric power driven hand tool, said reducer comprising a generally cup-shaped cylindrical housing adapted to be manually gripped and held stationary in the hand of the user, said housing having a removable end-wall and another end-wall parallel thereto, a sun gear having an axially outwardly projecting quill-shaft, mounted concentrically in the housing and axially spaced from said removable end-wall, means removably securing the sun gear to said other end-wall with said quill-shaft extending through said other end-wall, a cage sized for rotating movement within the housing and being disposed in outwardly spaced co-axial relation to the sun gear, said cage having a shaft journaled in said removable end-wall and extending outwardly therethrough, said shaft being in co-axial alignment with the sun gear, said cage also including arms formed integrally with the shaft and extending radially outwardly therefrom in symmetrical relationship, each arm being provided at its outer end with an arm-extension which is parallel to the axis of the shaft, a driven gear disposed within the housing with its axis in concentric alignment with the sun gear and the shaft of the cage, said driven gear having one end face axially spaced from the inwardly presented surfaces of the arms, a ball-type anti-friction thrust bearing operatively interposed between said end face and said surfaces, a driven shaft operatively associated with said driven gear and having said thrust-transmitting tool operatively connected thereto, and extending journalwise through the quill-shaft, said driven gear further being provided with a short stub shaft extending oppositely therefrom with respect to the driven shaft and in co-axial alignment therewith, said stub shaft being socketed bearingwise in the cage in concentric alignment with the shaft of the cage, said sun gear and driven gear being respectively provided with different numbers of teeth, and planetary gears rotatably mounted in the cage and simultaneously meshing with the sun gear and driven gear.

References Cited in the file of this patent

UNITED STATES PATENTS

| | | |
|---|---|---|
| 403,756 | Jetter | May 21, 1889 |
| 1,256,687 | Haas | Feb. 19, 1918 |
| 1,632,571 | Watson | June 14, 1927 |
| 1,920,956 | Burton | Aug. 8, 1933 |
| 1,951,424 | Lewis | Mar. 20, 1934 |
| 2,001,180 | Buckner | May 14, 1935 |
| 2,566,211 | Keesling | Aug. 28, 1951 |

FOREIGN PATENTS

| | | |
|---|---|---|
| 15,426 1893 | Great Britain | June 16, 1894 |
| 422,422 | Italy | June 16, 1947 |
| 992,134 | France | Oct. 15, 1951 |